Patented Feb. 3, 1948

2,435,211

UNITED STATES PATENT OFFICE 2,435,211

DRILLING FLUID COMPOSITION

James M. Gillet, Evanston, Ill., assignor to Victor Chemical Works, a corporation of Illinois No Drawing. Application August 6, 1945, Serial No. 609,331

4 Claims. (Cl. 252—8.5)

This invention relates to a drilling fluid composition, and more particularly to the use of controlled amounts of ferrophosphorus as a weighting material for well drilling fluid.

A vast number of materials have been suggested for the use of the drilling mud art. The function of the weighting agents is to impart a high hydrostatic head to the drilling fluid. The weighting agents, however, must not increase materially the viscosity and gelling character of the normal clay suspensions. Furthermore, the surface characteristics of the weighting agents should be such as to prevent "gas-cutting'" which is the dispersion of gases through the mud which lowers its effective density. Barium sulfate has been one of the most effective standard weighting agents, and it may be employed effectively to produce a mud weighing as much as 18 lbs. per gallon.

Ferrophosphorus of the above grade is quite brittle and may be economically milled to produce a powder having a particle size smaller than 200 meshes per inch and containing less than 2% by weight of particles smaller than 3 microns in diameter. Such material is quite suitable for suspension in aqueous suspensions of colloidal clays. I have found, for example, that a bentonite-containing drilling fluid may be weighted with the powdered ferrophosphorus to give drilling fluids of a density ranging from 10 to approximately 26 lbs. per gallon. For example, a drilling fluid comprising 1.25 parts by weight of Wyoming bentonite, 75.0 parts of minus 325 mesh milled ferrophosphorus containing 25.2% phosphorus, and water sufficient to give a suspension weighing 22 lbs. per gallon had a viscosity of 73 A. P. I. seconds.

I have also found that viscosity reducing agents, such as tetrasodium pyrophosphate, metaphosphates, polyphosphates, and other viscosity reducing agents normally employed in commercial drilling fluids can be successfully employed in the ferrophosphorus suspension to give high density muds of low viscosity.

A 5% bentonite suspension weighing 8.6 lbs. per gallon was weighted with minus 325 mesh ferrophosphorus (25.2% P content) to 23.7 lbs. per gallon and treated with 0.25% tetrasodium pyrophosphate and 0.025% sodium tetrapolyphosphate, to give a drilling fluid having a viscosity of 53.0 A. P. I. seconds and a pH value of 8.0.

For comparison a 5% bentonite suspension was weighted with barytes to 17.5 lbs. per gallon and treated with 0.075% tetrasodium pyrophosphate and 0.025% sodium acid pyrophosphate to give a drilling fluid having a viscosity of 109 A. P. I. seconds and a pH value of 7.0.

In the drilling of deep wells for oil and gas, extremely high gas pressures are often encountered which cannot be counteracted by the use of barytes and other known weighting agents in the drilling fluids. It is in these cases that the use of the ferrophosphorus weighting agent is most valuable. In many cases it is desirable to use the well known barytes-containing muds for the initial drilling operations as the drilling proceeds down to the point where the excessive gas pressure develops, and then add the powdered ferrophosphorus to further increase the weight of the mud. For example, a barytes mud may be economically used up to about 14 to 15 lbs. per gallon and then with ferrophosphorus added the weight may be further increased to 20 to 26 lbs. per gallon without unduly changing the viscosity and thixotropic characteristics of the fluid.

A 5% bentonite suspension was weighted to 14.2 lbs. per gallon with barytes and ferrophosphorus added to bring the weight up to 22 lbs. per gallon and the resulting mud treated with 0.050% by weight of sodium tetraphosphate. This mud had a viscosity of 110 A. P. I. seconds with no appreciable change after standing overnight at ordinary temperature.

Variations in the amounts of clay, bentonite, and viscosity reducing chemicals may be made to suit the local drilling conditions in the field without departing from the spirit of the invention.

The viscosity measurements employed in the above examples were made in accordance with the method outlined in American Petroleum Institute bulletin A. P. I. Code 29 (1938) and are stated as A. P. I. seconds meaning the number of seconds required for one quart of the fluid to run through a funnel with a $\frac{3}{16}$ inch diameter discharge opening.

Suitable viscosity reducing agents include the soluble alkali metal molecularly dehydrated phosphates, such as tetrasodium pyrophosphate, sodium tripolyphosphate, sodium tetrapolyphosphate, sodium hexametaphosphate, sodium acid pyrophosphate, and fused mixtures of such phosphates. These chemicals are preferably used in amounts ranging from 0.025% to 0.25% by weight of the drilling fluid.

Other viscosity reducing agents, such as tannin and quebracho extracts, may be employed if desired.

The following examples show tests made upon Louisiana drilling muds:

The first mud tested was one which had been weighted with barytes to 11 lbs. per gallon, and contained bentonite, non-colloidal clay, and other normal components. The mud had a viscosity of 52 A. P. I. seconds (165 grams Stormer) and a gel strength of 5 grams when tested immediately with a Stormer viscosimeter, and 50 grams when tested after standing for 10 minutes. The mud had a water loss of 7.2 cc. in 30 minutes determined by filtering the mud through a 3" diameter (Whatman No. 52) filter paper at a pressure of 100 lbs. per square inch. The filter cake was 2/32 inch thick and of good quality. Viscosity expressed in grams Stormer means the weight in grams required on the cord of a Stormer viscosimeter to cause the cup to rotate at 600 R. P. M. The gel strength or thixotropic character of the fluid was determined with the Stormer viscosimeter by noting the number of grams required to start the cup rotating immediately after agitation of the mud and again after the mud had stood for 10 minutes. These readings are taken as the immediate gel strength and the 10 minute gel strength and indicate the thixotropic character of the mud.

Tests were made on the above mud by increasing its weight with ferrophosphorus containing 24% phosphorus and ground to pass through a 200 mesh sieve with less than 2% by weight of particles smaller than 3 microns in diameter. The following table gives the results of a series of muds made up to different weights:

| Wgt., lbs./gal. | Viscosity Stormer, gms. | Gel Strength, gms. | | Water loss, cc. | Cake Thickness, inches | Quality |
|---|---|---|---|---|---|---|
| | | Immediate | 10 Min. | | | |
| 14.1 | 185 | 10 | 70 | 8 | 4/32 | Good. |
| 17.1 | 235 | 10 | 110 | 9 | 5/32 | Do. |
| 20.2 | 265 | 15 | 110 | 10 | 6/32 | Do. |
| 22.8 | 345 | 15 | 135 | 10.5 | 6/32 | Do. |
| 25.8 | 560 | 50 | 240 | 10 | 7/32 | Brittle. |

The viscosity of the 25.8 pound mud could be reduced from 560 grams to 240 grams by the addition of 3 cc. each of 6% solutions of sodium acid pyrophosphate and sodium tetraphosphate per 100 cc. of mud, and the mud rendered satisfactory.

In another series of tests the above 11 pound mud was weighted to 21 lbs. per gallon with different grades of ferrophosphorus and their stability determined after heating the muds at 160° F. for 18 hours.

The following table shows the results of these tests:

| Ferrophosphorus | Original | After 18 hrs. (160° F.) |
|---|---|---|
| 25% P: | | |
| Viscosity | 185 | 315 |
| Gel strength— | | |
| 0 Min | | 20 |
| 10 Min | | 250 |
| 24% P: | | |
| Viscosity | 185 | 330 |
| Gel strength— | | |
| 0 Min | | 20 |
| 10 Min | | 230 |
| 22% P: | | |
| Viscosity | 195 | 250 |
| Gel strength— | | |
| 0 Min | | 10 |
| 10 Min | | 85 |
| 20% P: | | |
| Viscosity | 185 | (¹) |
| Gel strength— | | |
| 0 Min | 5 | |
| 10 Min | 25 | |

¹ Too viscous and gas cut.

While the results using 20% phosphorus-containing ferrophosphorus are not satisfactory after heating the mud for 18 hours at 160° F., this mud should be satisfactory where high drilling temperatures are not involved. Chemical treatment of the muds in the above table with small amounts of sodium acid pyrophosphate lower viscosities and gel strengths of the heated muds to substantially their original values.

While the main advantage of milled ferrophosphorus in drilling fluids is that of obtaining high density fluids of low viscosity, it is also of advantage to employ the ferrophosphorus for low density fluids as a substitute for barytes and other weighting agents in drilling fluids ranging down to 10 lbs. per gallon. This advantage is due largely to the smaller percentage of solids present in the ferrophosphorus weighted drilling fluids.

This application is a continuation-in-part of my co-pending application 583,175, filed March 16, 1945, now abandoned.

The foregoing detailed description has been given for clearness of understanding only, and no unnecessary limitations should be understood therefrom.

What I claim as new and desire to secure by Letters Patent is:

1. A well drilling fluid suitable for use in wells having a ground temperature of the order of 160° F. and comprising an aqueous suspension of a colloidal clay and a sufficient amount of finely divided ferrophosphorus to give the drilling fluid a density of 10 to 26 lbs. per gallon, the ferrophosphorus having a 22 to 26% phosphorus content, and a particle size smaller than 200 meshes per inch and less than 2% by weight of the particles smaller than 3 microns in diameter.

2. The drilling fluid of claim 1 wherein said fluid contains an aqueous clay suspension including sufficient barytes to produce a weight of 14 to 15 lbs. per gallon, and ferrophosphorus sufficient to increase the weight to 20 to 26 lbs. per gallon.

3. The drilling fluid of claim 1 wherein said fluid contains an aqueous clay suspension including sufficient barytes to produce a weight not substantially more than 15 lbs. per gallon, and ferrophosphorus in sufficient quantity substantially to increase the specific gravity thereof.

4. In the drilling of subsurface wells with an aqueous suspension of drilling mud, in which the ground temperature is of the order of 160° F., the step of adding to the drilling mud a suspension of ferrophosphorus having a maximum particle size of about 200 mesh containing not more than 2% by weight of particles less than 3 microns in size, and having a phosphorus content between 22% and 26%.

JAMES M. GILLET.

(References on following page)

REFERENCES CITED

The following references are of record in the file of this patent:

UNITED STATES PATENTS

| Number | Name | Date |
|---|---|---|
| 2,226,520 | Lenel | Dec. 24, 1940 |
| 2,257,114 | Harth | Sept. 30, 1941 |
| 2,260,499 | Williams | Oct. 28, 1941 |
| 2,276,075 | Wuensch | Mar. 10, 1942 |
| 2,336,470 | Davis | Dec. 14, 1943 |
| 2,370,396 | Cordiano | Feb. 27, 1945 |
| 2,393,047 | Krase | Jan. 15, 1946 |
| Re. 22,191 | Wade | Sept. 29, 1942 |

FOREIGN PATENTS

| Number | Country | Date |
|---|---|---|
| 492,318 | Great Britain | Sept. 19, 1938 |

OTHER REFERENCES

Chaney, A Review of Recent Advances in Drilling Mud Control, article in The Oil Weekly, Nov. 23, 1942, page 38.

Uren, Drilling Fluid Technology, part 2, article in The Petroleum Engineer, Nov. 1942, page 49.